(12) United States Patent
Chen et al.

(10) Patent No.: US 7,787,552 B2
(45) Date of Patent: Aug. 31, 2010

(54) DISTRIBUTED TRANSMIT DIVERSITY IN A WIRELESS COMMUNICATION NETWORK

(75) Inventors: Wanshi Chen, San Diego, CA (US); Young C. Yoon, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1335 days.

(21) Appl. No.: 11/106,092

(22) Filed: Apr. 14, 2005

(65) Prior Publication Data

US 2006/0233275 A1 Oct. 19, 2006

(51) Int. Cl.
*H04L 1/02* (2006.01)
(52) U.S. Cl. .............. 375/267; 375/295; 375/299; 455/101; 455/132; 455/500; 370/334
(58) Field of Classification Search ............ 375/267, 375/295, 299; 455/101, 132, 500; 370/334
See application file for complete search history.

(56) References Cited

U.S. PATENT DOCUMENTS

| | | | |
|---|---|---|---|
| 6,115,427 A | 9/2000 | Calderbank et al. | |
| 6,542,556 B1 | 4/2003 | Kuchi et al. | |
| 6,577,875 B1 * | 6/2003 | Brouwer | 455/522 |
| 6,618,454 B1 | 9/2003 | Agrawal et al. | |
| 7,042,858 B1 * | 5/2006 | Ma et al. | 370/331 |
| 7,263,132 B2 * | 8/2007 | Horng et al. | 375/267 |
| 7,428,268 B2 * | 9/2008 | Shen et al. | 375/267 |
| 2002/0012380 A1 * | 1/2002 | Hottinen et al. | 375/130 |
| 2002/0122381 A1 | 9/2002 | Wu et al. | |
| 2003/0092379 A1 | 5/2003 | Brothers Jr. et al. | |
| 2004/0116146 A1 * | 6/2004 | Sadowsky et al. | 455/525 |

(Continued)

FOREIGN PATENT DOCUMENTS

EP 1 185 048 3/2002

(Continued)

OTHER PUBLICATIONS

Goeckel et al., "Space-Time Coding for Distributed Antenna Arrays," Jun. 20, 2004, pp. 747-751, Piscataway, NJ, XP10710421.

(Continued)

*Primary Examiner*—David C Payne
*Assistant Examiner*—Leon Flores
(74) *Attorney, Agent, or Firm*—Coats & Bennett, P.L.L.C.

(57) ABSTRACT

A wireless communication network is configured to provide distributed diversity transmissions, wherein different diversity-coded versions of the same information signal are transmitted from each of two or more network sectors. The diversity-coded versions of the information signal are based on space-time or space-frequency codes, and the information signal may comprise a dedicated channel signal targeted to an individual user or a broadcast signal targeted to one or more users. Thus, spaced-apart network transmitters, which may be located at the same cell site, or at different cell sites, are configured to transmit diversity-coded versions of a given information signal and, in this manner, the advantages of space-time and/or space frequency transmission coding may be applied across multiple sectors of a communication network. Such transmissions may be used to improve soft and softer handoff reception of dedicated channel signals, and to improve reception of Broadcast-Multicast Services (BC-MCS) signals, or the like.

34 Claims, 3 Drawing Sheets

U.S. PATENT DOCUMENTS

| | | | |
|---|---|---|---|
| 2005/0031050 A1* | 2/2005 | Kim et al. | 375/267 |
| 2005/0245206 A1* | 11/2005 | Kaikkonen et al. | 455/101 |
| 2005/0265280 A1* | 12/2005 | Roh et al. | 370/328 |
| 2006/0209749 A1* | 9/2006 | Blanz et al. | 370/328 |

FOREIGN PATENT DOCUMENTS

| | | |
|---|---|---|
| EP | 1 487 134 | 12/2004 |
| WO | WO 03/081938 | 10/2003 |

OTHER PUBLICATIONS

Goeckel, D. and Hao, Y., "Macroscopic Space-Time Coding: Motivation, Performance Criteria, and a Class of Orthogonal Designs"; Conference on Information Sciences and Systems; 2003; pp. 68-75; John Hopkins University.

Derryberry, R.T. et. al., "Transmit diversity in 3G CDMA systems,"; IEEE Communications Magazine; Apr. 2002; pp. 68-75.

Alamouti, S.M., "A simple transmit diversity technique for wireless communications," IEE J. Select. Areas Communications; Oct. 1998; pp. 1451-1458; vol. 16.

Kaiser, S., "OFDM with code division multiplexing and transmit antenna diversity for mobile communications," Proc. IEE International Symposium on Personal, Indoor and Mobile Radio Communications; Sep. 2000; pp. 804-808; London, United Kingdom.

Kaiser, S., "Spatial transmit diversity techniques for broadband OFDM systems," Proc. IEEE Globecom Conference; Nov./Dec., 2000; pp. 1824-1828; San Francisco, USA.

Kaiser, S., "Standard conformable antenna diversity techniques for OFDM and its applications," Proc. IEEE Globecom Conference; Nov. 2001; pp. 3100-3105; San Antonio, USA.

Kuo, C-H. et. al., "Robust video transmission over wideband wireless channel using space-time coded OFDM systems," Proc. IEEE Wireless Communications and Networking Conference; Mar. 17-21, 2002; pp. 931-936; Orlando, USA.

Yoon, Y.C., "Quadriphase DS_CDMA with pulse shaping and the accuracy of the Gaussian Approximation for matched filter receiver performance analysis," IEEE Trans. Wireless Communications; Oct. 2002; pp. 761-768; vol. 1.

Damnjanovic, Jelena, "Measure of system load on reverse link," 3GPP2 C30-20021120-016QC; Nov. 20, 2002; 3 pages.

Sohn, I. et. al., "Comparison of SFBC and STBC for transmit diversity in OFDM system," IEEE 802.20 Working Group on Mobile Broadband Wireless Access (IEEE C802.20-03/49); May 5, 2003; 13 pages.

Choi, H. et. al, "STC Macro-Diversity Transmission"; IEEE 802.16 Broadband Wireless Access Working Group; Aug. 18, 2004; 7 pages.

Choi et al., "STC Macro-Diversity Transmission", IEEE 802.16 Broadband Wireless Access Working Group, Aug. 18. 2004.

Goeckel et al., "Macroscopic Space-Time Coding: Motivation, Performance Criteria, and a Class of Orthogonal Designs", 2003 Conference on Information Sciences and Systems, The Johns Hopkins University, Mar. 12-14, 2003.

Tang et al., "Coded Transmit Macrodiversity: Block Space-Time Codes over Distributed Antennas," May 6, 2001, pp. 1435-1438, New York, NY, XP-001067201.

Zeevy et al., "Using Space Time Code on FDMA/TDMA based System with Soft and Hard Handoff Algorithms" pp. 218-220, Piscataway, NJ, XP-10631106.

Pusane et al, "Power Control for Orthogonal Space-Time Coding With Multiple Receive Antennas," Sep. 15, 2002, pp. 95-99, Piscataway, NJ, XP-10614194.

* cited by examiner

DISTRIBUTED TRANSMIT DIVERSITY IN A WIRELESS COMMUNICATION NETWORK

BACKGROUND OF THE INVENTION

The present invention generally relates to communication signal processing, and particularly relates to distributed transmit diversity in wireless communication networks.

Maintaining acceptable communication performance in mobile communication environments poses significant challenges. For example, the relative movement between a wireless communication transmitter and receiver gives rise to complex and dynamically changing channel fading conditions. Even in low-mobility circumstances, one or more propagation paths between a particular transmitter and receiver may be severely faded because of obstructions.

Conventional wireless communication networks may employ different forms of transmit diversity to mitigate at least some of the fading problems mentioned above. For example, some types of Code Division Multiple Access (CDMA) networks use simple spatial diversity to improve reception performance under certain conditions. With spatial diversity, the same signal is transmitted from two or more antennas and travels to the intended receiver over different propagation channels. Reception is improved because each propagation channel generally has independent fading characteristics, assuming that the transmit antennas are not co-located elements within closely spaced antenna array.

For co-located transmit antennas, a different form of transmit diversity may be used. It is known, for example, to use space-time coding for the transmission of a given information signal via co-located antenna elements. The use of co-located antenna array elements is a general characteristic of conventional space-time coding systems, wherein different antenna elements in a transmit antenna array are used to transmit space-time coded signals. As one example, the well-known Alamouti scheme generally uses two co-located antenna array elements to transmit a 2×2 space-time code word (STC), which can be decoded by an appropriately configured receiver.

SUMMARY OF THE INVENTION

In one aspect of the present invention, different diversity-coded versions of a given information signal are transmitted from multiple sectors of a wireless communication network, based on employing a set of diversity codes across the involved sectors. As such, the targeted receiver(s) benefit from spatial and temporal (or spectral) diversity reception. Note that for purposes of discussion herein, the term "diversity codes" encompasses both space-time code sets and space-frequency code sets, unless otherwise indicated.

As taught herein, one embodiment of a diversity transmission method comprises transmitting an information signal from two or more sectors of a wireless communication network to at least one mobile station by generating diversity-coded versions of the information signal according to a set of diversity codes, transmitting a different diversity-coded version of the information signal from each of the two or more sectors, and controlling the transmission to effect a substantial balance in diversity code strengths at the at least one mobile station.

The diversity codes may be space-time codes, such as Alamouti codes, for example. More generally, however, generating diversity-coded versions of an information signal according to a set of diversity codes comprises generating M diversity-coded versions of the information signal according to a set of diversity codes. With that approach, diversity transmission comprises transmitting the M diversity-coded versions of the information signal from N sectors of the wireless communication network. If M=N, then a different diversity-coded version of the information signal is transmitted from each of the involved sectors. If M<N, then a least one of the different diversity-coded versions of the information signal is transmitted from more than one of the involved sectors.

The single-sector or combined-sector transmission strength used for transmitting each diversity-coded version of the information can be controlled to balance the diversity code strengths as received at the mobile station(s). Alternatively, or additionally, the number of individual sectors used for transmitting each diversity-coded version of the information signal can be controlled to balance the diversity code strengths at the mobile station(s). Balancing is desirable because balanced code strengths at the remote receiver(s) improve the diversity gains.

Diversity transmission as taught herein may be applied to different types of signals. For example, in at least one embodiment, diversity transmission is used for individual users' information signals, e.g., dedicated channel signals. For example, a base station system can be configured to use diversity transmission for mobile stations in soft or softer handoff with the base station system. In a softer handoff scenario, two or more sector transmitters at the same radio base station transmit a different diversity-coded version of the same user's information signal. The diversity-coding circuit(s) to carry out diversity-coding of that user's information signal may be located at the radio base station, or at an associated base station controller.

In that same embodiment, or in other embodiments of a base station system, diversity transmission is applied to soft handoff transmissions of a given user's signal, wherein a particular mobile station is in soft handoff with different radio base stations. In such soft handoff conditions, different diversity-coded versions of the mobile station's information signal are transmitted from different radio base stations. The radio base stations may be under control of the same base station controller, or different base station controllers may be involved. In either case, the base station controller(s) may perform the diversity coding and send the different diversity-coded versions of the user's information signal to the involved radio base stations for transmission, or the radio base stations each may receive the same information signal and perform diversity coding as part of transmit processing. The base station controllers may be set up to communicate with each other regarding the diversity codes to be used for transmitting the different diversity-coded versions of the information signal.

Further, in at least one embodiment, the wireless communication network is configured to use diversity transmission as taught herein for Broadcast-Multicast Services (BCMCS) signals. For example, a base station system can be configured to broadcast different diversity-coded versions of a BCMCS signal from one or more of its sectors. More generally, different diversity-coded versions of a given BCMCS signal can be transmitted from different sectors of the communication network, whether those sectors are part of the same base station system, or belong to multiple base station systems.

In either case, a wireless communication network node may be configured to generate the different diversity-coded versions of the BCMCS signal, for distribution to the involved sector transmitters. Alternatively, the BCMCS signal may be distributed to the involved sector transmitters, each of which is configured to perform diversity coding as part of transmission processing. In that latter case, a centralized node still may be configured to set, track and/or manage the particular space-time (or space-frequency) codes being used at each of the sector transmitters. It also should be noted that these same node-based centralized distribution, coding, and/or code management concepts could be applied to diversity transmission of one or more dedicated channel signals. Note, too, that different diversity codes or code sets can be used for different information signals.

Further, the particular codes used for generating the different diversity-coded versions of a BCMCS or dedicated channel signal may be arranged across the sector transmitters of a given geographic region according to a multi-sector diversity code distribution pattern. The particular diversity code distribution adopted for a given region may be based on analytical or empirical data.

Regardless of how it is determined, a given diversity code distribution pattern may be dynamically updated as part of ongoing diversity transmission operations. That is, the diversity codes being used for diversity coding a particular information signal can be dynamically changed at one or more of the sectors transmitting the diversity-coded versions of that information signal. Such changes may be performed according to pre-configured information, or according to information communicated from the network to the involved mobile stations. Information sent from the network to the mobile stations regarding dynamic redistribution of diversity codes may be sent on the fly and/or as part of call setup.

Of course, the present invention is not limited to the above features and advantages. Those skilled in the art will recognize additional features and advantages upon reading the following detailed description, and upon viewing the accompanying drawings.

DETAILED DESCRIPTION OF THE INVENTION

Figure 1:
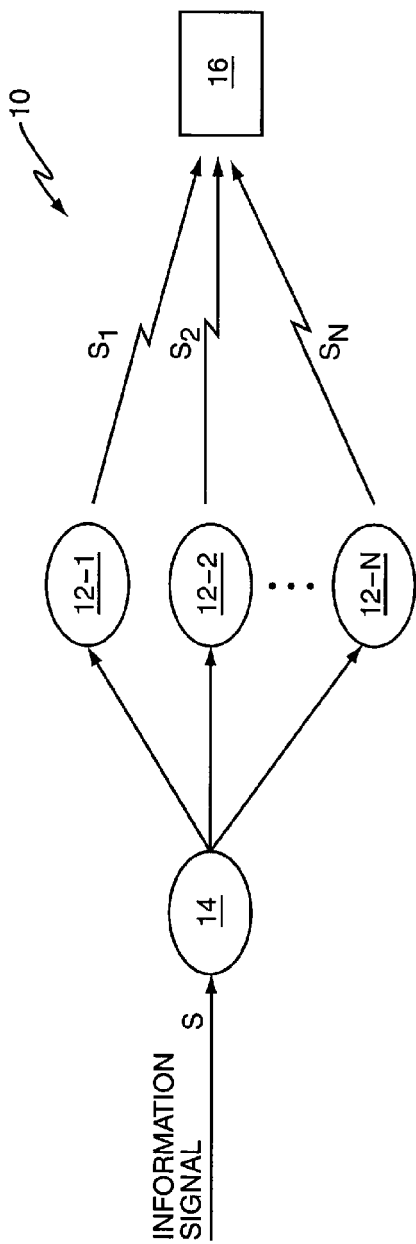
FIG. 1 is a block diagram of distributed transmit diversity in one embodiment of a wireless communication network.

FIG. 1 is a block diagram partially illustrating a wireless communication network 10 that is configured according to one embodiment of diversity-coded transmission as taught herein. Each of a number of spaced-apart transmitters 12 receives a different diversity-coded version of the same information signal, s, from one or more diversity-coding circuits 14, which may be implemented as a separate node within the network 10. By way of non-limiting example, the transmitters 12 may comprise sector transmitters located at one radio base station, or may comprise sector transmitters at different radio base stations, and the diversity-coding circuit(s) 14 may comprise processing circuits located in a base station controller that is associated with the radio base station(s).

Regardless, the information signal may comprise a dedicated channel signal targeted to a particular mobile station 16, or may be a Broadcast-Multicast Services (BCMCS) signal, or other type of broadcast signal, targeted to a potentially large number of mobile stations 16. Moreover, it should be understood that the network 10 could provide similar diversity-coded transmissions for additional information signals, which may be dedicated channel signals, broadcast signals, or any combination thereof.

More broadly, it should be understood that transmit diversity as taught herein can be applied to terrestrial communication networks, satellite-based communication networks, and to mixed networks including both terrestrial and satellite-based communication stations. In satellite-based implementations, the term "sector" may comprise a defined service region targeted by a particular antenna array or beam of a given satellite-based transmitting station, which may be considered a node within the larger network. Thus, the illustrated embodiment of network 10 thus should be understood as a non-limiting example.

Regardless, the information signal, depicted as signal s in the illustrated embodiment, can be diversity-coded by the diversity-coding circuit(s) 14, and a different diversity-coded version of that signal can be transmitted from each of the transmitters 12 (shown as 12-1 through 12-N). For example, the transmitter 12-1 transmits a first diversity-coded version of the signal s, denoted as s1, the transmitter 12-2 transmits a second diversity-coded version of the signal s, denoted as s2, and so on. In at least one embodiment, the diversity-coding circuit(s) 14 are configured to use a set of space-time codes, while in one or more other embodiments, they are configured to use a set of space-frequency codes. Whether space-time or space-frequency coding is used can be a matter of network type. For example, space-time coding complements CDMA networks, which generally use the same carrier frequency across multiple base stations. In other types of networks, space-frequency coding may be a more complementary choice and the term "diversity code" is used to refer to either space-time codes or space-frequency codes unless contextually noted otherwise.

Figure 2:
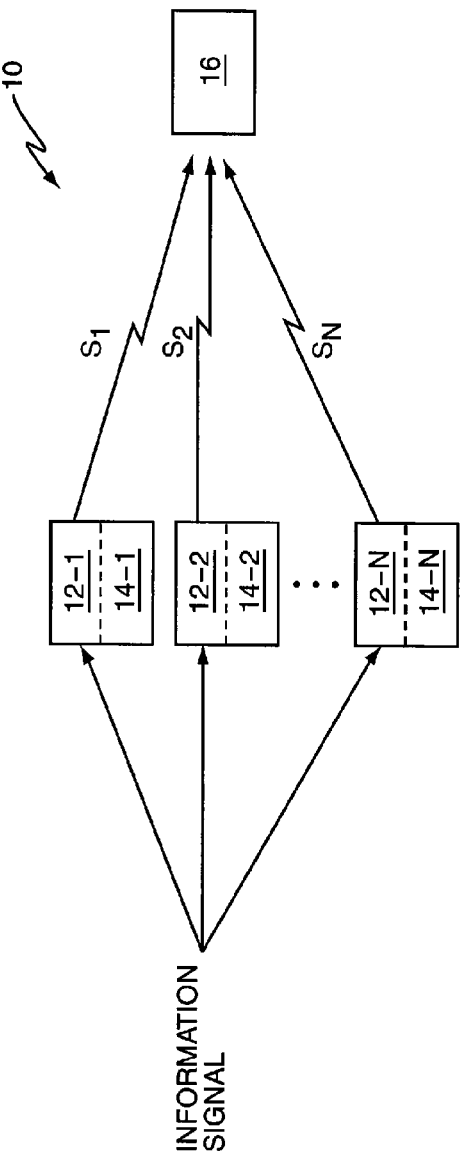
FIG. 2 is a block diagram of distributed transmit diversity in another embodiment of a wireless communication network.

FIG. 2 illustrates another embodiment of the network 10, wherein the diversity-coding circuit(s) 14 are co-located with the transmitters 12. Indeed, diversity-coding circuitry may be incorporated into each of the transmitters 12; such that diversity coding is implemented by the transmitters 12 as part of transmit processing, at least for selected ones of the signals being transmitted by them. With the embodiment of FIG. 2, a given information signal may be distributed to the transmitters 12 by one or more base station controllers (not shown). The particular code(s) used at each one of the transmitters 12 can be fixed by design, set according to network provisioning information stored at the transmitters 12, or communicated to the transmitters 12, from the base station controller(s) associated with them, for example. In that latter case, the code(s) used at each transmitter 12 can be fixed by base station controller provisioning information, or can be dynamically assigned.

Figure 3:
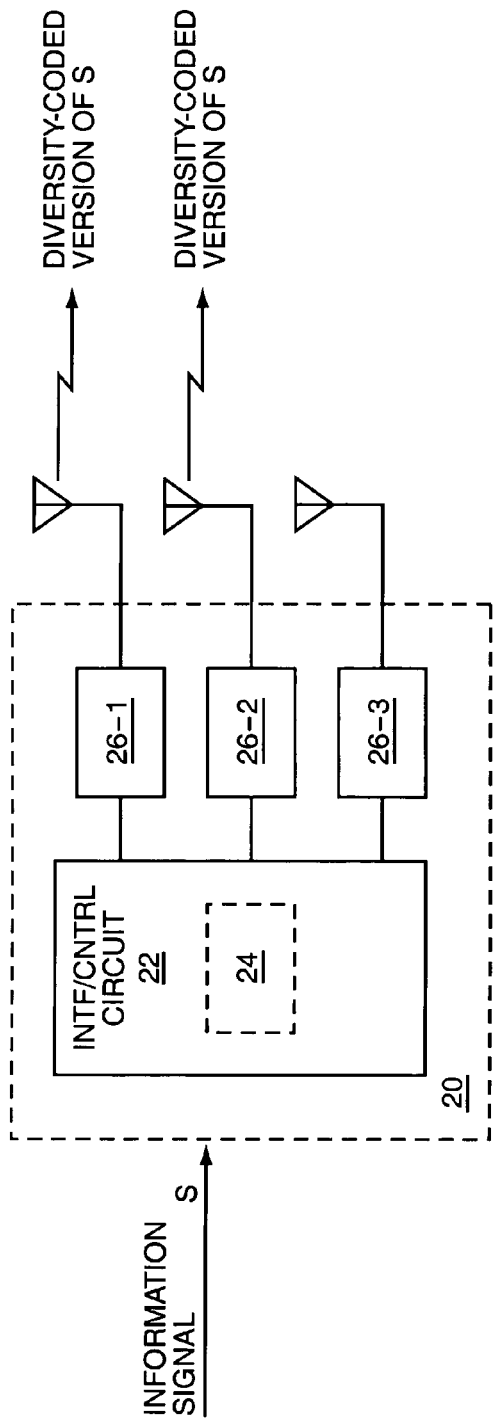
FIG. 3 is a block diagram of one embodiment of a radio base station configured for diversity coding.

The functionality of the transmitters 12 and the diversity-coding circuit(s) 14 may be implemented in a radio base station embodiment, as shown in FIG. 3. The illustrated radio base station (RBS) 20 is configured for diversity-coding one or more information signals received from an associated base station controller, for example. The RBS 20 comprises interface/control circuits 22, which include diversity-coding circuits 24, and a plurality of sector transmitters 26 (shown as sector transmitters 26-1, 26-2, and 26-3). The RBS 20 may be configured for operation according to a variety of wireless communication network standards, including those based on CMDA or Orthogonal Frequency Division Multiplexing (OFDM) signal types.

In one embodiment, the RBS 20 can be configured to employ diversity coding for mobile stations 16 that are in softer handoff with it. That is, in circumstances where the same information is being transmitted to a given mobile station 16 from two or more of the RBS's sector transmitters 26, the RBS 20 sends a different diversity-coded version of that mobile station's information signal from each of the involved sector transmitters 26. Such diversity coding can be managed at the RBS-level, via the included diversity-coding circuits 24.

Figure 4:
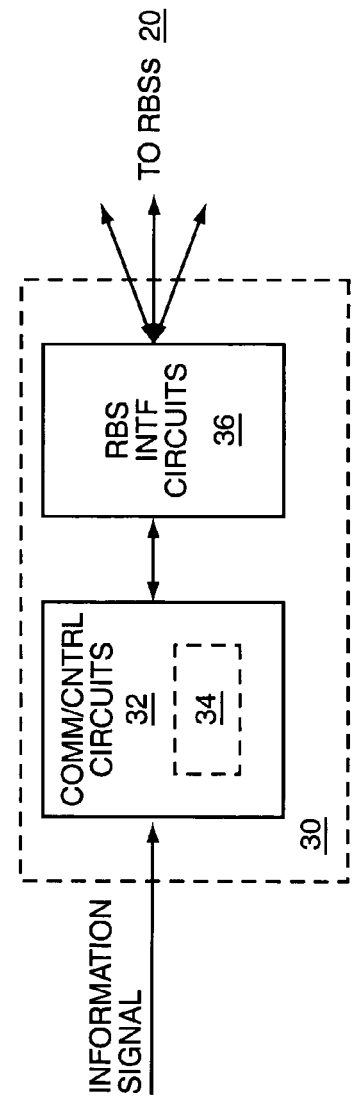
FIG. 4 is a block diagram of one embodiment of a radio base station controller configured to diversity coding.

For soft handoff conditions on the forward link, wherein a given mobile station 16 is being served from two or more sectors located at different RBSs 20, diversity coding may be implemented by one or more base station controllers (BSCs) associated with the involved RBSs 20. FIG. 4 illustrates an embodiment of a BSC 30 that is configured for BSC-level diversity coding of information signals, and comprises communication/control circuits 32, which include diversity-coding circuits 34, and RBS interface circuits 36.

Note that with the BSC-level implementation of diversity coding shown in FIG. 4, the diversity-coding circuits 24 may be omitted from the RBS 20. However, leaving the RBSs 20 with their own diversity coding circuits may offer advantages for softer handoff scenarios, and may reduce the BSC-RBS communication load in certain scenarios. For example, if a given information signal is to be transmitted from two or more sectors of a given RBS 20, it can be sent from the BSC 30 to the RBS 20 as a single information signal, and the RBS 20 can generate the multiple, diversity-coded versions of that signal for transmission. In the alternative, where the diversity coding is done at the BSC-level (or higher), each of the different diversity-coded versions of the same information signal is sent from the BSC 30 to the RBS 20. Obviously, the latter embodiment offers certain advantages regarding a more centralized approach in the network 10 to diversity coding, but comes at the expense of requiring potentially more communication resources between the different network entities.

In at least one embodiment, the diversity-coding circuits are located at the RBS 20 for both softer and soft handoff. In soft handoff scenarios, the BSC 30 directs the diversity coding of the RBS 20 (e.g., the BSC 30 tells the RBS 20 which codes or type of codes to use).

In other embodiments, at least a portion of the diversity-coding circuit(s) reside at higher levels in the network hierarchy, and/or comprise centralized resources that provide for full or partial diversity coding control across a number of other network nodes, e.g., across BSCs 30 and/or RBSs 20. Thus, in at least one embodiment, diversity transmission is implemented in a system for use in a wireless communication network, wherein that system comprises two or more sector transmitters 26, each configured to transmit a diversity-coded version of an information signal, one or more diversity coding circuits configured to generate the diversity-coded versions of the information signal for transmission from the two or more sector transmitters 26, and configured to control transmission of the diversity-coded versions of the information signal to effect a substantial balance in diversity code strengths at the at least one mobile station 16.

The system may comprise a radio base station system that includes one or more RBSs 20, which include the two or more sector transmitters 26, and a BSC 30 configured to control the RBSs 20. Further, the BSC 30 may include the diversity coding circuits, which may be configured to balance diversity code strengths at the at least one mobile station 16 by controlling the number of sectors 26 used to transmit each diversity-coded version of the information signal and/or by controlling the transmit powers of the sectors 26 being used to transmit the diversity-coded versions of the information signal.

Further, the diversity-coding circuits may be distributed between two or more BSCs 30, or they may reside at least partially apart from the BSC(s) 30. Thus, the diversity-coding circuits can be configured to control transmission of the diversity-coded versions of the information signal by two or more BSCs 30, such that RBSs 20 operating under different BSCs 30 cooperate to effect a substantial balance in diversity code strengths at the at least one mobile station 16.

With these and other embodiments in mind, FIGS. 3 and 4 illustrate non-limiting variations of distributed transmit diversity that may be practiced within a base station system. Thus, with a focus on distributed diversity transmission, a base station system generally comprises sector transmitters (e.g., RBS sector transmitters 26), and diversity coding circuits (e.g., diversity coding circuits 24 and/or 34). In one embodiment, a base station system comprises a BSC 30 and at least one RBS 20, wherein the RBS 20 includes diversity-coding capabilities, or the BSC 30 includes diversity-coding capabilities, or they both do. In other embodiments, some or all of the diversity coding functions are centralized within the network 10, or at least centralized for a given group of sectors.

Figure 5:
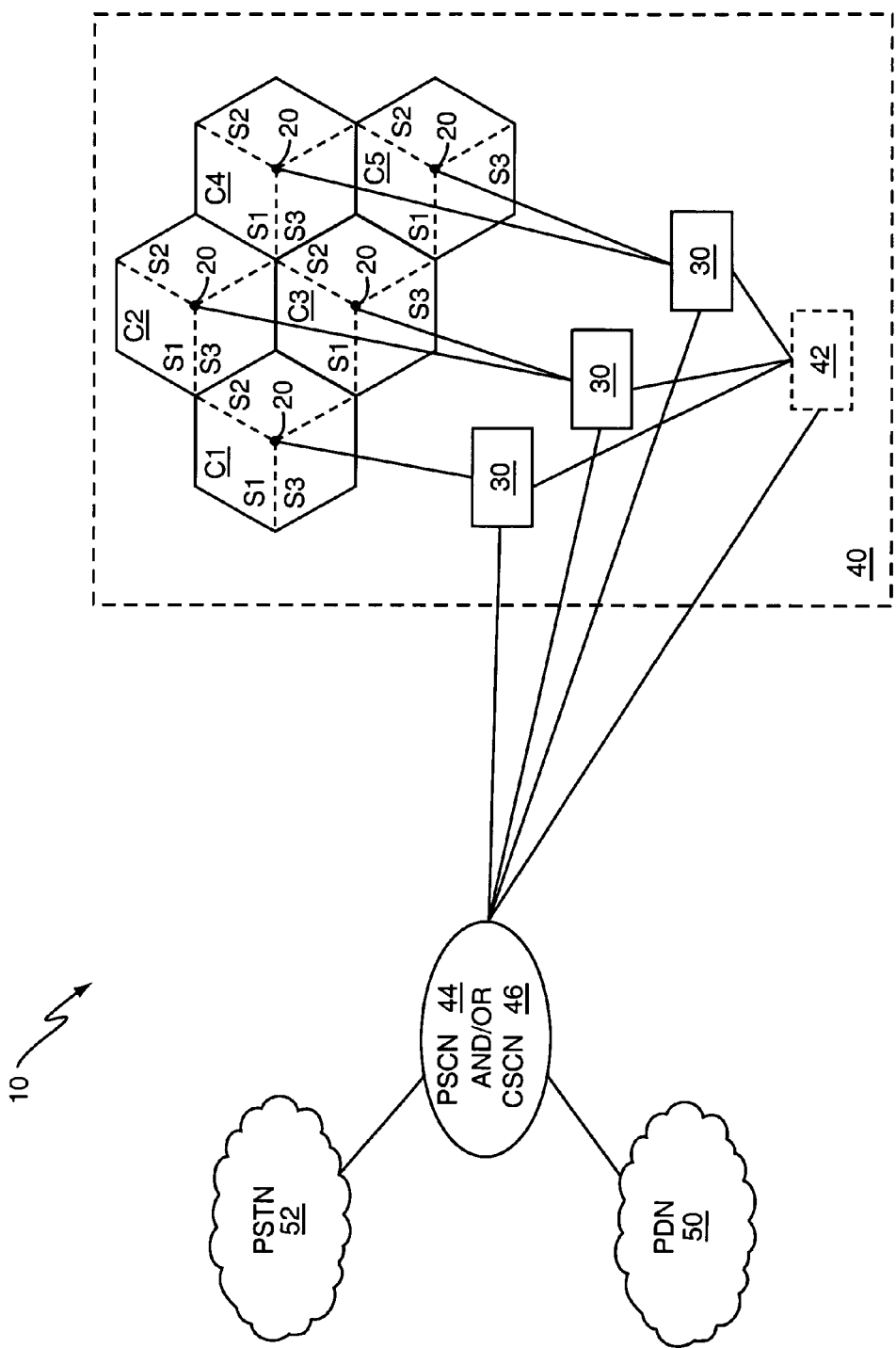
FIG. 5 is a block diagram of distributed transmit diversity in another embodiment of a wireless communication network.

FIG. 5 illustrates an embodiment of the network 10 that is useful for discussing other aspects of centralized diversity coding. As illustrated, the network 10 comprises a Radio Access Network (RAN) 40, which includes a number of BSCs 30 and RBSs 20, and further includes a centralized node 42 that is configured for diversity-coding at least some types of information signals. The network 10 further includes a Packet Switched Core Network (PSCN) 44 and/or a Circuit Switched Core Network (CSCN) 46, that communicatively couple mobile stations 16 being supported by the RAN 40 to one or more external networks. Such networks may comprise a Public Data Network (PDN) 50, such as the Internet, or may comprise the Public Switched Telephone Network (PSTN) 52.

Regardless, each BSC 30 controls one or more RBSs 20, and each RBS 20 defines a radio cell (e.g., cell "C1," "C2," etc.), with each such cell divided into multiple radio sectors (e.g., sector "S1," "S2," and "S3"). The BSCs 30 receive information signals that are processed and passed along for transmission by the appropriate RBSs 20. As noted, these information signals may be broadcast signals intended for a group of mobile stations 16, or dedicated channel signals intended for particular ones of the mobile stations 16, or some mix thereof.

In one embodiment, diversity coding is done at the BSC level and/or at the RBS level, as previously discussed herein. However, in addition to those levels of diversity coding, or as an alternative to BSC or RBS diversity coding, the centralized node 42 may be configured for centralized diversity coding of at least some types of information signals. Thus, in one embodiment, the centralized node 42 may be configured to generated diversity-coded versions of one or more broadcast signals. With that approach, dedicated channel signal diversity-coding still may be performed at the BSC level, or at the RBS level, as is appropriate for soft or softer handoff transmission modes. Of course, it should be understood that other combinations of centralized and non-centralized diversity coding are contemplated herein.

In at least one embodiment of the network 10, at least some aspects of multi-sector diversity coding involved centralized functions. For example, the centralized node 42 can be configured to process signal strength feedback, channel information, or other form of received signal information feedback from one or more mobile stations 16 that are receiving diversity transmissions. The node 42 may then send control message, commands, or other signal information to one or more BSCs 30, such that multiple BSCs 30 and RBSs 20 are controlled to effect the desired diversity code strength balancing at the one or more mobile stations 16. In other embodiments, the BSCs 30 may carry out feedback processing and provide corresponding reports to the node 42, which may then send individual or distributed control information to the BSCs 30 involved in the transmission of diversity-coded signals to particular mobile stations 16, such that a desired diversity code strength balance is achieved at those mobile stations 16.

In another aspect, the node 42 may be configured to maintain one or more sets of diversity codes to be used for diversity coding, and can be configured to assign particular diversity codes to particular sectors of the network 10. Further, the centralized node 42 can be configured to update the per-sector code assignments dynamically for one or more information signals subject to diversity-coded transmission. In this manner, the pattern of diversity code distribution among the involved sectors changes, which may benefit reception under certain conditions. The mechanism used to drive the dynamic pattern changing may be based on empirical data or based on analytical data.

As a non-limiting example, the performance gains of diversity coding may depend on the relative strengths of the different diversity-coded versions of the information signal, as received by the mobile station 16. For example, consider Alamouti codes with its use of two space-time code types. With Alamouti coding, reception performance gains at the mobile station 16 generally are maximized when the mobile station 16 "sees" the two codes at equal strength.

Thus, if one code is dominant, the performance gain can be negligible. As such, dynamic code pattern changes may consider making equal-strength codes for the mobile station(s) 16, particularly for the dedicated channel case. That is, the network 10 may be configured to transmit diversity-coded versions of a given information signal, such that the one or more mobile stations 16 interested in that information signal, receive the differently coded versions at substantially the same signal strength.

In one embodiment, the network 10 uses channel information returned from the mobile station(s) 16 for this purpose. As used herein, the term "channel information" is used broadly to denote information directly or indirectly related to the propagation channels between the mobile station(s) 16, and the sectors of the network 10 involved in transmitting diversity-coded versions of a given information signal. By way of non-limiting examples, the channel information returned by a given mobile station 16 may include one or more of channel quality indicators, pilot strength measurement reports, and partial or full feedback of channel information (e.g., propagation channel coefficient feedback).

With such details in mind, assume that a given mobile station 16 currently is served by three sectors in a softer or soft handoff service scenario. If the reported pilot strengths from the mobile station 16 for sector S1 is better than that of sector S2 and sector S3, it may be better to configure sector S1 to use a first code ("code 1"), and configured both sector S2 and sector S3 to use a second code ("code 2"). With this approach, the combined received signal strength of code 2 from sectors S2 and S3 can be made to better balance the received signal strength of code 1 from sector S1. In other words, the selection of which sector transmitters are used to generate particular ones of the diversity-coded versions of a given information signal can be varied, such that the differently coded diversity signals are balanced at the mobile station(s) 16, in terms of their received signal strength.

The network 10 also may use other criteria or other measurements to control code strength balancing within a given sector, or sectors of the network 10. For example, the network 10 may control the code/sector transmission powers, and/or control which codes are transmitted from which sectors, to provide equal strength code reception for a given user, or a given group of users. By way of non-limiting example, the network 10 may be configured to balance code strengths for a given class of users, as a group, or as individuals, i.e., code strength balancing may be performed for "gold" class users, but not necessarily for "bronze" class users. In other circumstances, the network 10 may attempt to balance code strengths for a targeted group of users located in the same geographic area. For example, if a plurality of mobile stations 16 were congregated at a sporting event, a BCMCS signal associated with that event may be transmitted such that substantially equal strength codes are received in and around the stadium area.

Such balancing may comprise setting the transmit powers of transmitters that are nearby the location to a relatively lower power, and setting transmitters that are further away from the location to a relatively higher power. By way of non-limiting example, assume that two diversity-coded versions of an information signal are to be transmitted to a congregated group of users. Further assume that one transmitter is relatively close (or co-located) with the congregated users, and that two other transmitters are relatively further away. With these assumptions, the network 10 may transmit a first diversity-coded version of the information signal from the nearby transmitter at a given transmit power, and transmit a second diversity-coded version of the information from each of the two transmitters that are further away. The transmit powers of the near and far transmitters can be controlled separately or jointly such that the aggregate power of the two remote transmitters balances with the power of the nearby transmitter, to achieve the desired diversity code strength balance for the congregated users.

Regardless of any such code strength-balancing activities, as an alternative to centralized control of code pattern changing, the network 10 may be configured such that the distributed nodes responsible for diversity coding change their diversity codes at pre-agreed times, according to pre-agreed changes. Such an approach may be particularly easy in CDMA networks, where there is network-wide synchronization among the various nodes, e.g., wherein the BSCs 30 and/or the RBSs 20 are all operating relative to a common time reference. With such embodiments, an individual RBS 20 may be configured to change the diversity codes being used by two or more of its sector transmitters 26 according to some timed schedule (or according to a distributed trigger, such as one sent by the centralized node 42, for example).

Even where the network 10 is not configured to use a dynamically changing code distribution pattern, diversity codes may be distributed among a group of network sectors according to a defined pattern that optimizes code re-use among the sectors. For example, a given RBS 20, or neighboring RBSs 20, can be configured to use particular ones in a set of diversity codes, or to use particular sets of diversity codes, when diversity-coding multiple information signals, to reduce potential interference between the different diversity-coded versions of those information signals.

In this approach, a network operator may establish a diversity code usage pattern for a group of network sectors, and then provision the involved network entities (e.g., BSCs, RBSs, etc.) to implement the adopted code use pattern. As before, the particular pattern of code distribution among the sectors may be based on empirical data, analytic data, etc.

Broadly, it should be appreciated that some multi-sector patterns of diversity code distribution among the sectors may be preferred over others, and that a particular multi-sector distribution pattern may be adopted on a static basis in one or more embodiments, and that in other embodiments, such patterns may be dynamically updated during the transmission of the information signal(s) being diversity transmitted.

More broadly, and irrespective of whether such multi-sector code distribution patterns are used, it should be understood that the present invention contemplates generating diversity-coded versions of a given information signal, using either space-time codes or space-frequency codes, and transmitting those diversity-coded versions of the information signal from two or more radio sectors of a wireless communication network 10. The sectors may be at the same RBS 20, or may be at different RBSs 20.

As such, the present invention contemplates the transmission of diversity-coded signals from transmission locations that are separated by significant distances (e.g., kilometers). The diversity transmissions may be based on Alamouti codes, for example, but also may be based on other space-time or space-frequency code sets. Further, such diversity transmission may be applied to broadcast signals intended for many more than one mobile station 16 and/or may be dedicated channel signals intended for targeted ones of the mobile stations 16. Still further, the present invention contemplates the use of joint distributed transmit diversity, wherein two or more of the sectors involved in transmitting diversity-coded versions of the same information signal use the same diversity codes.

Still further, at least some embodiments of the present invention contemplate transmitting diversity-coded versions of an information signal, such that the targeted mobile station(s) 16 receive equal-strength diversity codes (i.e., the network 10 attempts to balance the relative received signal strength of each diversity-coded version of the information signal at the mobile station(s) 16. Such operations may be based on channel information, such as pilot strength reporting, etc. In at least one embodiment of code-strength balancing, one or more nodes within the network 10 are configured to carry out diversity coding for one or more information signals according to an optimal (or near optimal) diversity code distribution pattern, based on user location, channel information, etc.

More generally, it should be understood that at least one embodiment of diversity-coding transmission as described herein comprises transmitting a number M diversity-coded versions of an information signal from a number N sectors of the wireless communication network 10, where M is less than, or equal to N. If M equals N, then each of the N sectors transmits a different one of the M diversity-coded versions of the information signal. If M is less than N, then the same diversity-coded version of the information signal is transmitted from more than one of the N sectors.

That is, at least one of the M diversity-coded versions of the information signal is jointly transmitted from at least two of the N sectors being used to transmit the different diversity-coded versions of the information signal. Having more sectors than diversity-coded versions of the information signal provides flexibility for selecting which versions will be jointly transmitted from which ones of the sector, and can be used as a mechanism to better balance the received signal strengths of the different diversity-coded versions at the mobile station 16. As a general approach, one embodiment of the network 10 is configured to transmit different ones of the diversity-coded versions of the information signal at different aggregate transmit powers as a function of channel information returned from the one or more mobile stations 16. That method may comprise transmitting different ones of the diversity-coded versions of the information signal at different aggregate transmit powers as a function of channel information from the one or more mobile stations 16, based on controlling the number of sectors used to transmit each diversity-coded version of the information signal, and the transmit powers used in that number of sectors to balance the received signal strengths of the different diversity-coded versions of the information signal at the one or more mobile stations 16.

With the above range of variations in mind, it should be understood that the present invention is not limited by the foregoing description, nor is it limited by the accompanying drawings. Instead, the present invention is limited only by the following claims, and their legal equivalents.

What is claimed is:

1. A method of transmitting an information signal from a wireless communication network to at least one mobile station comprising:

generating a number M diversity-coded versions of an information signal according to a set of diversity codes comprising space-time codes or space-frequency codes for transmission from a number N sectors of the wireless communication network, wherein N is greater than M;

transmitting a first one of the diversity-coded versions of the information signal from two or more of the N sectors of the wireless communication network;

transmitting at least one other of the M diversity-coded versions of the information signal from at least one other of the N sectors of the wireless communication network; and controlling said transmitting to effect a substantial balance in diversity code strengths at the at least one mobile station.

2. The method of claim 1, wherein controlling said transmitting to effect a substantial balance in diversity code strengths at the at least one mobile station comprises selecting the particular sectors of the wireless communication network that are used to transmit particular ones of the diversity-coded versions of the information signal based on channel information from the at least one mobile station.

3. The method of claim 2, wherein selecting the particular sectors of the wireless communication network that are used to transmit particular ones of the diversity-coded versions of the information signal based on channel information from the mobile station comprises selecting the particular sectors to be used for transmitting particular ones of the diversity-coded versions of the information signal, such that the different diversity-coded versions of the information signal have substantially equal received signal strength at the at least one mobile station.

4. The method of claim 1, wherein controlling said transmitting to effect a substantial balance in diversity code strengths at the at least one mobile station comprises transmitting different ones of the diversity-coded versions of the information signal at different aggregate transmit powers as a function of channel information from the at least one mobile station.

5. The method of claim 4, wherein transmitting different ones of the diversity-coded versions of the information signal at different aggregate transmit powers as a function of channel information from the one or more mobile stations comprises controlling the number of sectors used to transmit each diversity-coded version of the information signal, and the transmit powers used in that number of sectors to balance the received signal strengths of the different diversity-coded versions of the information signal at the one or more mobile stations.

6. The method of claim 1, wherein controlling said transmitting to effect a substantial balance in diversity code strengths at the at least one mobile station comprises controlling the selection of which sectors of the wireless communication network that are used to transmit which diversity-coded versions of the information signal, so that the mobile station receives all of the different diversity-coded versions of the information signal at substantially equal received signal strengths.

7. The method of claim 1, wherein controlling said transmitting to effect a substantial balance in diversity code strengths at the at least one mobile station comprises using channel information from the at least one mobile station to select which sectors are used to transmit which diversity-coded versions of the information signal.

8. The method of claim 1, wherein controlling said transmitting to effect a substantial balance in diversity code strengths at the at least one mobile station comprises using channel information from the at least one mobile station to control sector transmitter powers of the sectors being used to transmit the two or more diversity-coded versions of the information signal to the at least one mobile station.

9. The method of claim 1, wherein the at least one mobile station comprises a plurality of mobile stations congregated at a defined location, and wherein controlling said transmitting to effect a substantial balance in diversity code strengths at the at least one mobile station comprises transmitting one or more diversity-coded versions of the information signal at relatively lower powers from one or more sectors that are closer to the defined location, and transmitting one or more diversity-coded versions of the information signal at relatively higher powers from one or more sectors that are further from the defined location.

10. The method of claim 1, wherein the information signal comprises a Broadcast-Multicast Services (BCMCS) signal, and wherein generating two or more diversity-coded versions of an information signal according to a set of diversity codes comprises generating different diversity-coded versions of the BCMCS signal.

11. The method of claim 10, wherein transmitting different ones of the diversity-coded versions of the information signal from two or more sectors of the wireless communication network comprises transmitting a different one of the diversity-coded versions of the BCMCS signal from at least two different sectors.

12. The method of claim 1, wherein the information signal comprises a dedicated channel signal, and wherein generating two or more diversity-coded versions of an information signal according to a set of diversity codes comprises generating two or more different diversity-coded versions of the dedicated channel signal.

13. The method of claim 12, wherein transmitting different ones of the diversity-coded version of the information signal from two or more sectors of the wireless communication network comprises transmitting a different one of the diversity-coded versions of the dedicated channel signal from two or more sectors of the wireless communication network.

14. The method of claim 13, wherein transmitting a different one of the diversity-coded versions of the dedicated channel signal from two or more sectors of the wireless communication network comprises transmitting different diversity-coded versions of the dedicated channel signal from two or more co-located sectors of radio base station to a mobile station in softer handoff with the radio base station.

15. The method of claim 13, wherein transmitting a different one of the diversity-coded versions of the dedicated channel signal from two or more sectors of the wireless communication network comprises transmitting different diversity-coded versions of the dedicated channel signal from two or more sectors at different radio base stations to a mobile station in soft handoff with the different radio base stations.

16. The method of claim 1, further comprising determining which ones of the sectors being used to transmit the diversity-coded versions of the information signal use which diversity codes according to a multi-sector diversity code distribution pattern.

17. The method of claim 16, further comprising dynamically changing the multi-sector diversity code distribution pattern.

18. The method of claim 1, wherein the wireless communication network comprises a cellular radio network and wherein generating two or more diversity-coded versions of an information signal according to a set of diversity codes comprises generating a different diversity-coded version of the information signal at each of two or more sectors of the cellular radio network.

19. The method of claim 1, wherein generating two or more diversity-coded versions of an information signal according to a set of diversity codes comprises generating two diversity-coded versions of the information signal based on a set of Alamouti codes.

20. A system for use in a wireless communication network, the system comprising:
    a number N sector transmitters, each configured to transmit one or more of a number M diversity-coded versions of an information signal, wherein N is greater than M; and
    one or more diversity coding circuits configured to generate the diversity-coded versions of the information signal for transmission from the N sector transmitters, and configured to control transmission of the diversity-coded versions of the information signal so that a first one of the diversity-coded versions of the information signal is transmitted by two or more of the N sector transmitters and at least one other of the M diversity-coded versions of the information signal is transmitted by at least one other of the N sectors of the wireless communication network and so as to effect a substantial balance in diversity code strengths at the at least one mobile station.

21. The system of claim 20, wherein the system comprises a radio base station system comprising:
    one or more radio base stations that include the N sector transmitters; and
    a base station controller configured to control the radio base stations.

22. The system of claim 21, wherein the base station controller includes the one or more diversity coding circuits, and is configured to distribute diversity-diversity coded versions of a given information signal to be transmitted by the base station system to one or more of the radio base stations.

23. The system of claim 22, wherein the base station controller is configured to generate diversity-coded versions of information signals being transmitted by the base station system to mobile stations in soft or softer handoff with the base station system.

24. The system of claim 21, wherein the base station controller includes at least a portion of the one or more diversity coding circuits, and wherein the one or more diversity coding circuits are configured to balance diversity code strengths at the at least one mobile station by at least one of:

controlling the number of sectors used to transmit each diversity-coded version of the information signal; and controlling the transmit powers of the sectors being used to transmit the diversity-coded versions of the information signal.

25. The system of claim 20, wherein the one or more diversity coding circuits are configured to control transmission of the diversity-coded versions of the information signal by two or more base station controllers, such that radio base stations operating under different base station controllers cooperate to effect a substantial balance in diversity code strengths at the at least one mobile station.

26. The system of claim 20, wherein the N sector transmitters and the one or more diversity-coding circuits are located in a radio base station that comprises at least part of the base station system, and wherein the radio base station is configured to generate diversity-coded versions of information signals being transmitted by the radio base station to mobile stations in soft or softer handoff with the base station system.

27. A method of transmitting a Broadcast Multicast Services (BCMCS) signal from a wireless communication network to at least one mobile station comprising:

generating a number M diversity-coded versions of a BCMCS signal according to a set of diversity codes comprising space-time codes or space-frequency codes, for transmission from a number N sectors of the wireless communication network, wherein N is greater than M;

transmitting a first one of the diversity-coded versions of the BCMS signal from two or more of the N sectors of the wireless communication network;

transmitting at least one other of the M diversity-coded versions of the information signal from at least one other of the N sectors of the wireless communication network; and controlling said transmitting to effect a substantial balance in diversity code strengths at the at least one mobile station, based on selecting the particular sectors of the wireless communication network that are used to transmit particular ones of the diversity-coded versions of the BCMCS signal based on channel information from the at least one mobile station.

28. The method of claim 27, wherein selecting the particular sectors of the wireless communication network that are used to transmit particular ones of the diversity-coded versions of the BCMCS signal based on channel information from the mobile station comprises selecting the particular sectors to be used for transmitting particular ones of the diversity-coded versions of the BCMCS signal, such that the different diversity-coded versions of the BCMCS signal have substantially equal received signal strength at the at least one mobile station.

29. The method of claim 27, further comprising controlling said transmitting to effect a substantial balance in diversity code strengths at the at least one mobile station based on transmitting different ones of the diversity-coded versions of the BCMCS signal at different aggregate transmit powers as a function of channel information from the at least one mobile station.

30. The method of claim 27, further comprising controlling said transmitting to effect a substantial balance in diversity code strengths at the at least one mobile station based on controlling the selection of which sectors of the wireless communication network are used to transmit which diversity-coded versions of the BCMCS signal, so that the mobile station receives all of the different diversity-coded versions of the BCMCS signal at substantially equal received signal strengths.

31. The method of claim 27, further comprising controlling said transmitting to effect a substantial balance in diversity code strengths at the at least one mobile station based on using channel information from the at least one mobile station to select which sectors are used to transmit which diversity-coded versions of the BCMCS signal.

32. The method of claim 27, wherein the at least one mobile station comprises a plurality of mobile stations congregated at a defined location, and further comprising controlling said transmitting to effect a substantial balance in diversity code strengths for the plurality of mobile stations based on transmitting one or more diversity-coded versions of the BCMCS signal at relatively lower powers from one or more sectors that are closer to the defined location, and transmitting one or more diversity-coded versions of the BCMCS signal at relatively higher powers from one or more sectors that are further from the defined location.

33. The method of claim 27, further comprising determining which ones of the sectors being used to transmit the diversity-coded versions of the BCMCS signal use which diversity codes, according to a multi-sector diversity code distribution pattern.

34. The method of claim 33, further comprising dynamically changing the multi-sector diversity code distribution pattern.

* * * * *

UNITED STATES PATENT AND TRADEMARK OFFICE
CERTIFICATE OF CORRECTION

PATENT NO. : 7,787,552 B2  
APPLICATION NO. : 11/106092  
DATED : August 31, 2010  
INVENTOR(S) : Chen et al.

Page 1 of 1

It is certified that error appears in the above-identified patent and that said Letters Patent is hereby corrected as shown below:

On Page 2, in Field (56), under "OTHER PUBLICATIONS", in Column 1, Line 5, delete "et." and insert -- et --, therefor.

On Page 2, in Field (56), under "OTHER PUBLICATIONS", in Column 2, Line 1, delete "et." and insert -- et --, therefor.

On Page 2, in Field (56), under "OTHER PUBLICATIONS", in Column 2, Line 6, delete "Approcimation" and insert -- Approximation --, therefor.

On Page 2, in Field (56), under "OTHER PUBLICATIONS", in Column 2, Line 15, delete "et. al," and insert -- et al., --, therefor.

On Page 2, in Field (56), under "OTHER PUBLICATIONS", in Column 2, Lines 17-22, delete the repeated entries "Choi et al., "STC.........Mar. 12-14, 2003.".

On Page 2, in Field (56), under "OTHER PUBLICATIONS", in Column 2, Line 29, delete "al," and insert -- al., --, therefor.

In Column 4, Line 66, delete "CMDA" and insert -- CDMA --, therefor.

In Column 11, Line 56, in Claim 13, delete "version" and insert -- versions --, therefor.

In Column 12, Line 55, in Claim 22, delete "diversity-diversity coded" and insert -- diversity-coded --, therefor.

In Column 13, Line 29, in Claim 27, delete "BCMS" and insert -- BCMCS --, therefor.

Signed and Sealed this  
Thirtieth Day of August, 2011

David J. Kappos  
*Director of the United States Patent and Trademark Office*